(12) United States Patent
Nishimura et al.

(10) Patent No.: US 10,115,933 B2
(45) Date of Patent: Oct. 30, 2018

(54) ENERGY STORAGE APPARATUS

(71) Applicants: GS Yuasa International Ltd., Kyoto-shi (JP); Honda Motor Co., Ltd., Tokyo (JP)

(72) Inventors: Yosuke Nishimura, Koyto (JP); Masakazu Tsutsumi, Kyoto (JP); Yoshimasa Toshioka, Kyoto (JP)

(73) Assignees: GS YUASA INTERNATIONAL LTD, Kyoto-shi, Kyoto (JP); HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 15/140,298

(22) Filed: Apr. 27, 2016

(65) Prior Publication Data

US 2016/0329532 A1 Nov. 10, 2016

(30) Foreign Application Priority Data

May 8, 2015 (JP) ................................. 2015-095960

(51) Int. Cl.
| | |
|---|---|
| *H01M 2/02* | (2006.01) |
| *H01M 10/60* | (2014.01) |
| *H01M 2/10* | (2006.01) |
| *H01M 10/615* | (2014.01) |
| *H01M 10/613* | (2014.01) |
| *H01M 10/6553* | (2014.01) |

(52) U.S. Cl.
CPC ........... *H01M 2/02* (2013.01); *H01M 2/1016* (2013.01); *H01M 10/613* (2015.04); *H01M 10/615* (2015.04); *H01M 10/6553* (2015.04); *Y02E 60/13* (2013.01)

(58) Field of Classification Search
None
See application file for complete search history.

(56) References Cited

U.S. PATENT DOCUMENTS

| | | | |
|---|---|---|---|
| 6,033,800 | A | 3/2000 | Ichiyanagi et al. |
| 6,746,798 | B1 | 6/2004 | Hiratsuka et al. |

(Continued)

FOREIGN PATENT DOCUMENTS

| | | |
|---|---|---|
| JP | H09-199094 A | 7/1997 |
| JP | 2008-282648 A | 11/2008 |

(Continued)

OTHER PUBLICATIONS

JP 2009-0277471 A machine English translation.*

*Primary Examiner* — Scott J. Chmielecki
(74) *Attorney, Agent, or Firm* — McGinn I.P. Law Group, PLCC.

(57) ABSTRACT

An energy storage apparatus includes an energy storage device and an adjacent member adjacent to the energy storage device, wherein the energy storage device includes a case body for accommodating an electrode assembly, the case body having a body part including an opening at least a first end of the body part in a first direction, and a lid for closing the opening, the body part has a thick-walled part formed at least one of the first end and a second end of the body part in the first direction and a thin-walled part thinner than the thick-walled part, the adjacent member has a pair of sealing parts disposed at an interval in the first direction, and each of the sealing parts is in contact with the thin-walled part.

20 Claims, 11 Drawing Sheets

(56) References Cited

U.S. PATENT DOCUMENTS

2013/0270981 A1* 10/2013 Shishido ............ H05K 13/00
                                                    312/223.1
2014/0170474 A1*  6/2014 Roh ................. H01M 2/0217
                                                    429/185
2014/0370370 A1* 12/2014 Kawase ............. H01M 2/024
                                                    429/176

FOREIGN PATENT DOCUMENTS

| JP | 2009-277471 A |   | 11/2009 |
|----|---------------|---|---------|
| JP | 2009277471 A  | * | 11/2009 |
| JP | 2009277471 A  | * | 11/2009 |
| JP | 2013-206666 A |   | 10/2013 |
| WO | WO 99/25036 A1 |  | 5/1999  |
| WO | WO 2013/093965 A1 | | 6/2013 |

* cited by examiner

ENERGY STORAGE APPARATUS

CROSS-REFERENCE TO RELATED APPLICATIONS

This application claims the benefit of Japanese patent application No. 2015-095960, filed on May 8, 2015, which is incorporated by reference.

FIELD

The present invention relates to an energy storage apparatus having an energy storage device.

BACKGROUND

Conventionally, an assembled battery having a plurality of cells disposed in a stack and spacer members sandwiched between adjacent cells is known (for example, refer to JP-A-2013-206666). In such an assembled battery, a cooling circulation passage for supplying cooling air into gaps between cells is formed in order to cool each of the cells.

In the assembled battery, the spacer member has dividing parts extending in a stacking direction of the cells and connecting parts extending in parallel with surfaces of the cells. Therefore, the cooling circulation passage is formed between adjacent cells by the partition parts and the connecting parts of the spacer member and the surfaces of the cells.

Accordingly, in the assembled battery, each cell is cooled by cooling air supplied to the cooling circulation passage.

Incidentally, cells may include an outer case (can) for accommodating a power generating element, the outer case having an opening end and a body part thinner than the opening end (for example, refer to WO 99/025036). In this cell, since a wall thickness at the opening end is thicker than that at the body part, a temperature in an inside of the opening end is unlikely to drop more than a temperature in an inside of the body part does when the opening end and the body part are exposed to cooling air. Therefore, a cooling efficiency of the cell may decrease. Such a phenomenon is not limited to a case of cooling the cell. The phenomenon may also occur in a case of heating the cell.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus capable of efficiently cooling or heating an energy storage device.

An energy storage apparatus according to an aspect of the present invention includes: an energy storage device; and an adjacent member adjacent to the energy storage device, wherein the energy storage device includes a case body for accommodating an electrode assembly, the case body having a body part including an opening at least a first end in a first direction, and a lid for closing the opening, the body part has a thick-walled part formed at least one of the first end and a second end of the body part in the first direction and a thin-walled part thinner than the thick-walled part, the adjacent member has a pair of sealing parts disposed at an interval in the first direction, and each of the sealing parts is in contact with the thin-walled part.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
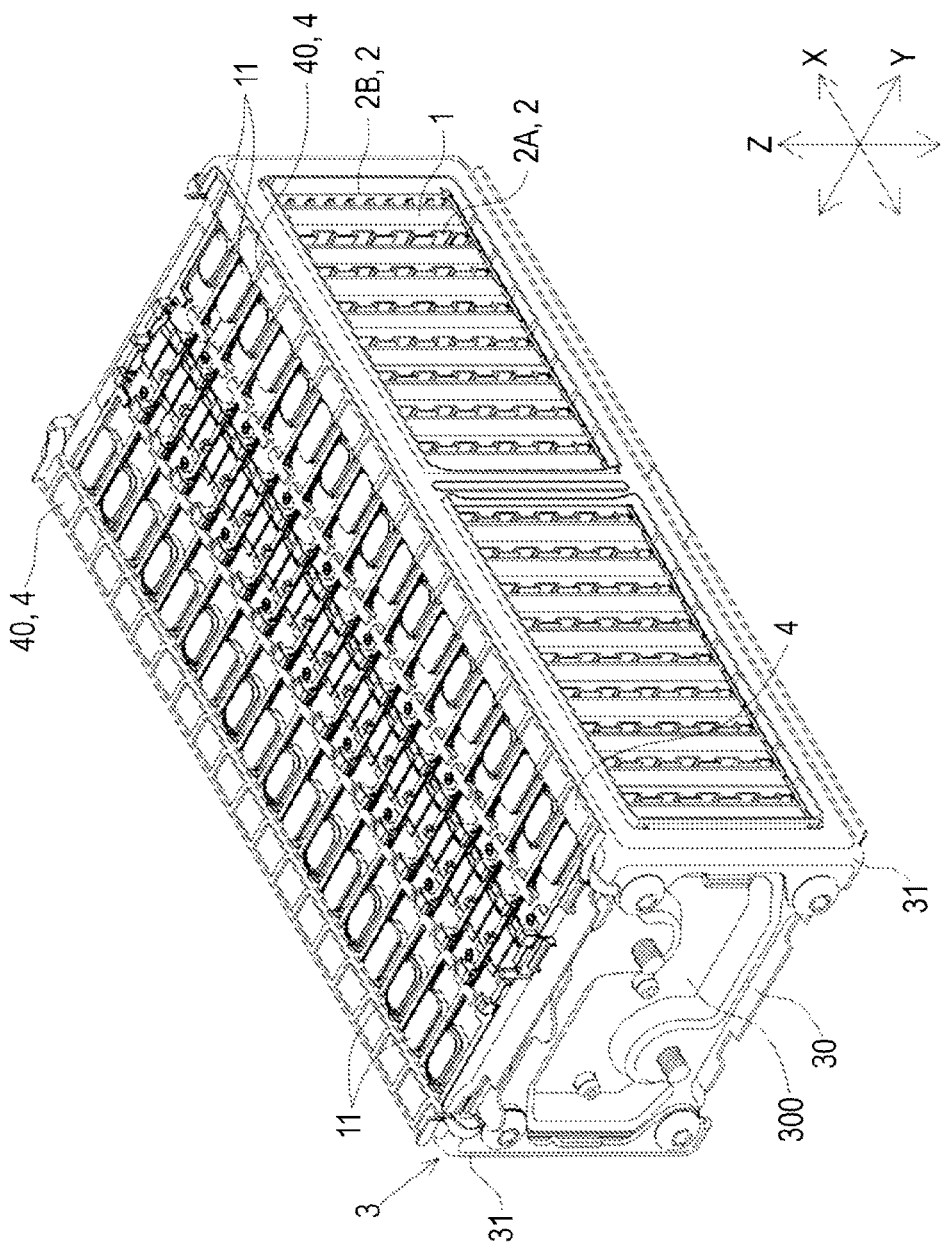
FIG. 1 is a perspective view of an energy storage apparatus according to an embodiment of the present invention.

An energy storage apparatus according to an aspect of the present invention includes: an energy storage device; and an adjacent member adjacent to the energy storage device, wherein the energy storage device includes a case body for accommodating an electrode assembly, the case body having a body part including an opening at least a first end in a first direction, and a lid for closing the opening, the body part has a thick-walled part formed at least one of the first end and a second end of the body part in the first direction and a thin-walled part thinner than the thick-walled part, the adjacent member has a pair of sealing parts disposed at an interval in the first direction, and each of the sealing parts is in contact with the thin-walled part.

According to such a structure, since the adjacent member adjacent to the energy storage device has the pair of sealing parts disposed at an interval in the first direction, it is possible to circulate fluid for cooling and heating the energy storage device between the pair of sealing parts. Furthermore, since each of the sealing parts is in contact with the thin-walled part, the pair of sealing parts can suppress the fluid in a vicinity of the thin-walled part from flowing toward a vicinity of the thick-walled part.

Accordingly, it is possible to enhance a cooling or heating efficiency of the energy storage device since the thin-walled part having a thinner wall thickness than that of the thick-walled part can be actively cooled or heated by concentrating the fluid on a region corresponding to the thin-walled part of the body part.

The adjacent member may have a base that extends along the energy storage device adjacent thereto, each of the sealing parts may protrude toward the energy storage device from the base, and an outer surface of the thick-walled part may protrude toward the base from an outer surface of the thin-walled part.

When a gap between the sealing parts and the thin-walled part is formed, the fluid flows from a vicinity of the thin-walled part toward a vicinity of the thick-walled part. Thus, a pressure loss occurs in the fluid flowing from a vicinity of the thin-walled part toward a vicinity of the thick-walled part since an outer surface of the thick-walled part protrudes toward the base from an outer surface of the thin-walled part.

Accordingly, even if a gap between the sealing parts and the thin-walled part is formed, the fluid is suppressed from flowing from a vicinity of the thin-walled part toward a vicinity of the thick-walled part. As a result, the fluid tends to concentrate on a vicinity of the thin-walled part and thereby a cooling or heating efficiency of the energy storage device tends to increase. In this case, an outer surface of the thick-walled part may be configured to be closer to the base with increasing distance from the thin-walled part in the first direction. According to this structure, since a gap between the outer surface of the thick-walled part and the base of the adjacent member is smaller with increasing distance from the thin-walled part in the first direction, a pressure loss occurring in the fluid flowing from a vicinity of the thin-walled part toward a vicinity of the thick-walled part becomes larger.

At least one sealing part of the pair of sealing parts may be in contact with the thin-walled part and the thick-walled part.

According to this structure, since one sealing part is in contact with the thin-walled part and the thick-walled part, the fluid is more reliably suppressed from flowing from a vicinity of the thin-walled part toward a vicinity of the thick-walled part. Accordingly, since the fluid tends to concentrate on a vicinity of the thin-walled part, a cooling or heating efficiency of the energy storage device tends to increase.

The energy storage device may include an external terminal disposed on an outer surface of the lid, and the thick-walled part may have a first thick-walled part formed at the first end of the body part in the first direction.

Since the first thick-walled part formed in the first end of the body part in the first direction tends to conduct heat of the external terminal generated during charging and discharging, a temperature of the first thick-walled part tends to rise. However, according to this structure, since the thin-walled part is actively cooled, heat of a first thick-walled part is kept to be conducted to the thin-walled part. As a result, a temperature of the first thick-walled part tends to drop. Accordingly, since the first thick-walled part and the thin walled part are effectively cooled, the cooling efficiency of the energy storage device is further enhanced.

The body part may be joined to the lid through a welding part formed in the first thick-walled part.

According to this structure, since the welding part is formed in the first thick-walled part thicker than the thin-walled part, a welding depth and a welding area of the welding part are easy to increase. Therefore, it is possible to improve joining strength and stabilize welding quality of the body part and the lid.

The adjacent member may define a circulation region for circulating fluid between the adjacent member and the energy storage device by the pair of sealing parts in contact with the thin-walled part.

According to this structure, since the circulation region for circulating fluid between the adjacent member and the energy storage device is defined by the pair of sealing parts in contact with the thin-walled part, the fluid flowing through the circulation region may be suppressed from flowing outside the circulation region by the pair of sealing parts. In other words, the fluid flowing in a vicinity of the thin-walled part may be suppressed from flowing toward a vicinity of the thick-walled part by the pair of sealing parts.

Accordingly, since the thin-walled part whose wall thickness is thinner than that of the thick-walled part is actively cooled or heated by concentrating the fluid on the circulation region corresponding to the thin-walled part of the body part, a cooling or heating efficiency of the energy storage device may be enhanced.

An energy storage apparatus according to another aspect of the present invention includes an energy storage device and a spacer adjacent to the energy storage device, wherein the energy storage device includes a case body for accommodating an electrode assembly, the case body including an opening at a first end in a first direction, and a lid for closing the opening, the case body has a thick-walled part formed at the first end of the case body in the first direction and a thin-walled part thinner than the thick-walled part, and the case body is joined to the lid through a welding part formed in the thick-walled part, the spacer has a base that extends along the adjacent energy storage device and a pair of sealing parts disposed at an interval in the first direction and defines a circulation region for circulating fluid between the spacer and the energy storage device by the pair of sealing parts protruding from the base and being in contact with the thin-walled part, and an outer surface of the thick-walled part protrudes toward the base from the thin-walled part.

According to this structure, since each of the sealing parts is in contact with the thin-walled part, the fluid is suppressed from flowing from a vicinity of the thin-walled part toward a vicinity of the thick-walled part by the pair of sealing parts.

Accordingly, since the thin-walled part thinner than the thick-walled part is actively cooled or heated by concentrating the fluid on a region corresponding to the thin-walled part of the body part, a cooling or heating efficiency of the energy storage device may be enhanced.

As described above, an energy storage apparatus capable of efficiently cooling or heating an energy storage device can be provided.

Hereinafter, one embodiment of an energy storage apparatus is described with reference to the drawings. Note that a name of each component of the present embodiment is used in the present embodiment and may be different from a name of each component in the background art.

Figure 2:
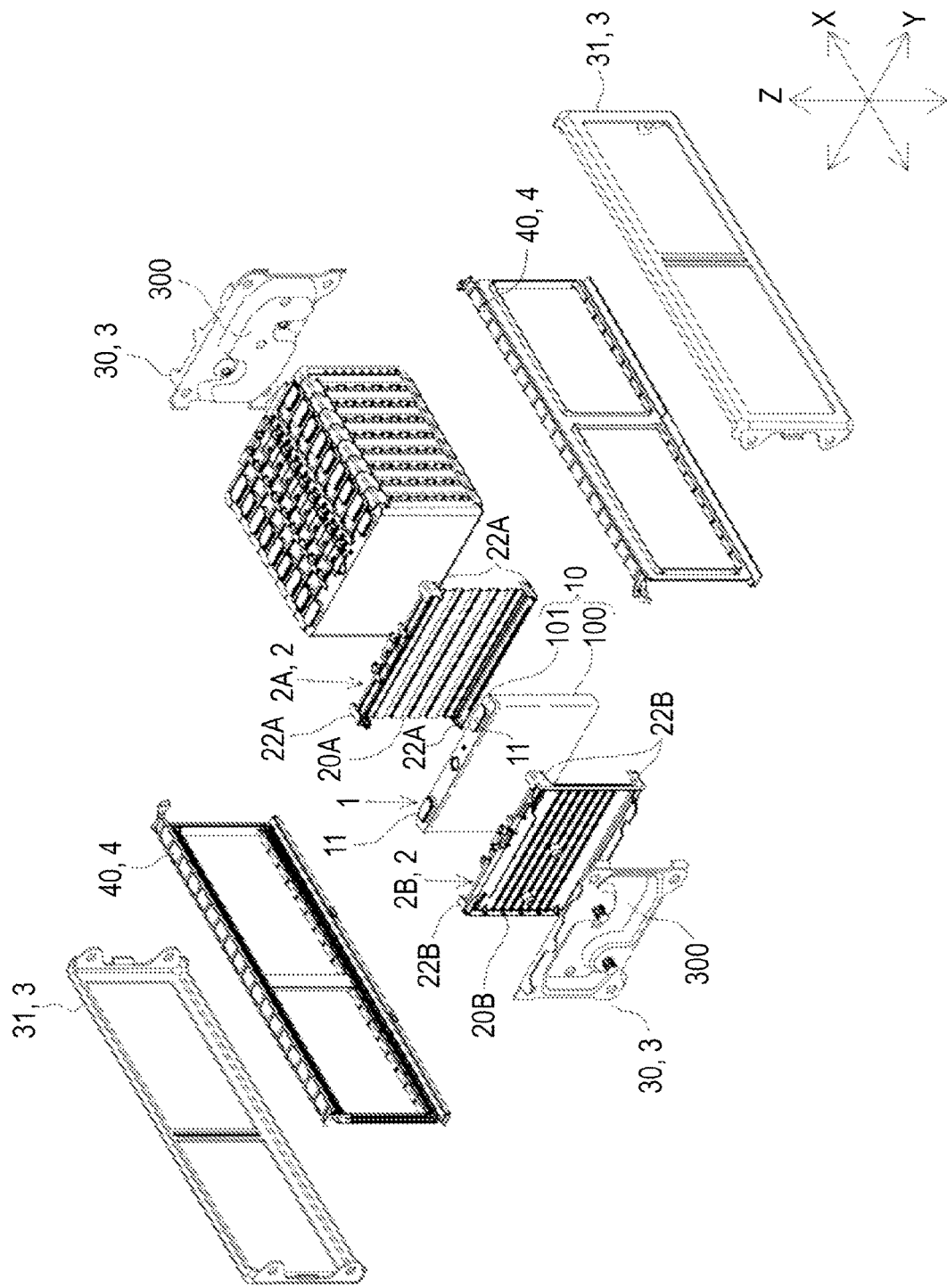
FIG. 2 is an exploded perspective view of the energy storage apparatus according to the embodiment.

The energy storage apparatus includes energy storage devices 1 and spacers (adjacent members) 2 adjacent to the energy storage devices 1 as shown in FIG. 1 and FIG. 2. The energy storage apparatus includes holding members 3 for holding the energy storage devices 1 and the spacers 2 together. The holding members 3 are molded from conducting material. Because of this, the energy storage apparatus includes insulators 4 disposed between the energy storage devices 1 and the holding members 3.

Figure 3:
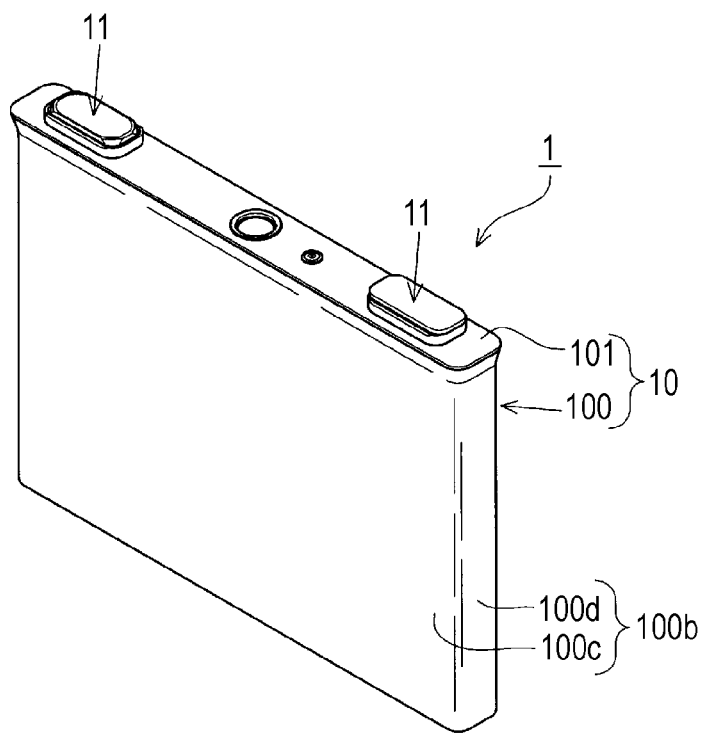
FIG. 3 is a perspective view of an energy storage device.
Figure 3:
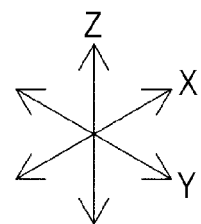

As shown in FIG. 3, the energy storage device 1 includes a case body 100 for accommodating an electrode assembly including a positive electrode and a negative electrode and having an opening. The energy storage device 1 includes a lid 101 for closing the opening of the case body 100. The energy storage device 1 includes a pair of external terminals 11 disposed on an outer surface of the case body 100 or an outer surface of the lid 101. The case body 100 and the lid 101 will hereinafter be referred to as a case 10.

In other words, the case 10 includes the case body 100 having an opening. The case 10 includes the lid 101 for closing the opening of the case body 100.

Figure 4:
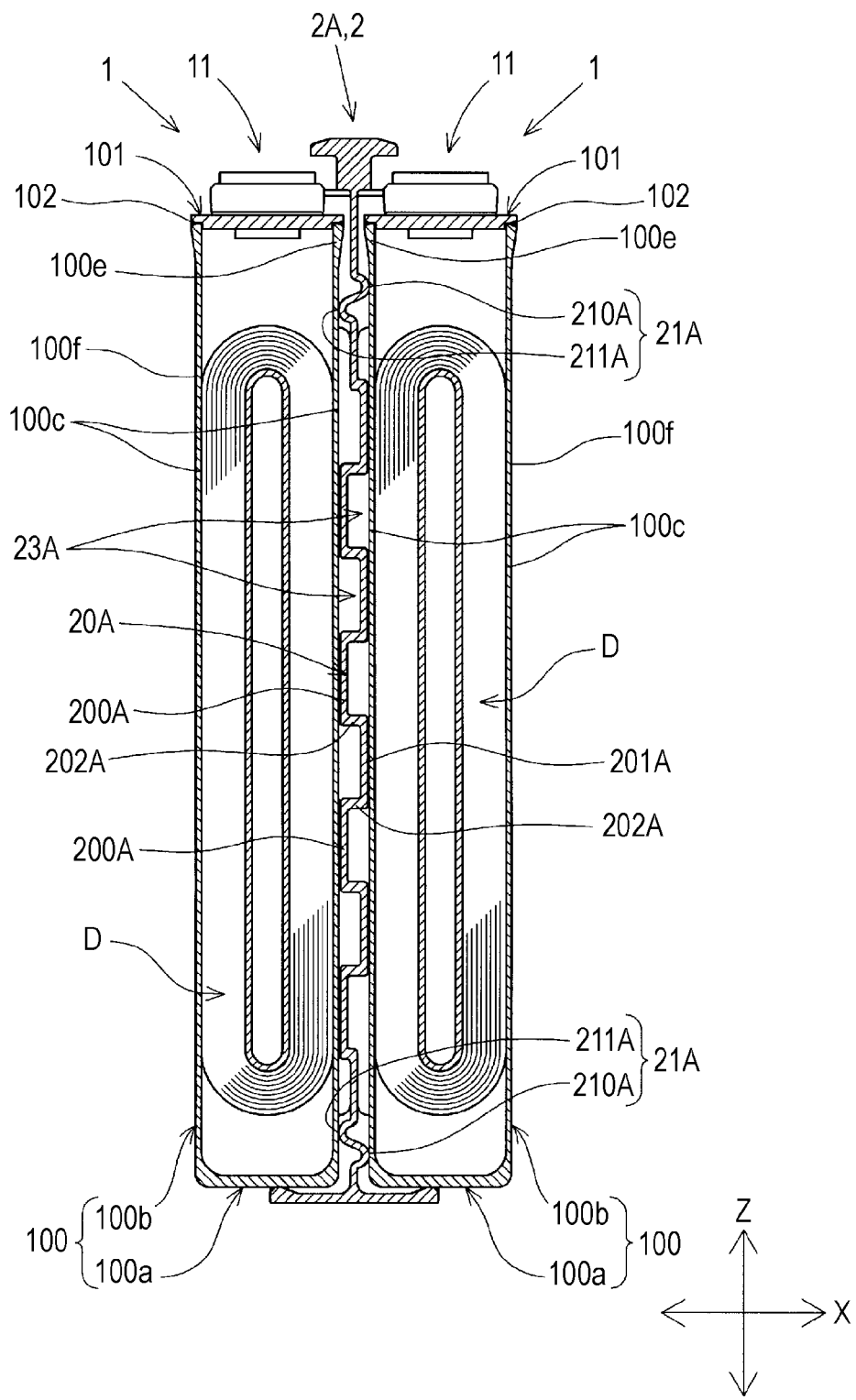
FIG. 4 is a vertical cross-sectional view of the energy storage device and an inner spacer.

As shown in FIG. 3 and FIG. 4, the case body 100 is a bottomed cylinder. The case body 100 includes a closing part 100a of a plate shape, the closing part 100a having an inner surface facing toward an inside of the case 10 and an outer surface facing toward an outside of the case 10, and a body part 100b connected to a circumference edge of the closing part 100a, the body part 100b being cylindrical, extending to an inner surface side of the closing part 100a, and surrounding an inner surface of the closing part 100a.

The body part 100b opens at a first end in a first direction. A second end of the body part 100b in the first direction is closed by the closing part 100a. The body part 100b according to the present embodiment includes a pair of first walls 100c facing each other with an interval and a pair of walls 100d facing each other across the pair of first walls 100c. A surface area of the first wall 100c is greater than a surface area of the second wall 100d. Therefore, the body part 100b has a flat rectangular cylindrical shape.

Furthermore, as shown in FIG. 4, the body part 100b includes a thick-walled part 100e formed at least one of the first end and the second end in the first direction and a thin-walled part 100f thinner than the thick-walled part 100e. The body part 100b in the present embodiment includes a thick-walled part 100e formed in the first end and a thin-walled part 100f thinner than the thick-walled part 100e. In other words, the thick-walled part 100e is formed by the first end of the body part 100b and the thin-walled part 100f is formed by the second end and a portion between the first end and the second end of the body part 100b.

The thick-walled part 100e is formed so as to protrude outward from the thin-walled part 100f. Thus, the outer surface of the thick-walled part 100e is closer to the spacer 2 than the outer surface of the thin-walled part 100f. A gap is formed between the outer surface of the thick-walled part 100e and the spacer 2. A distance between the outer surface of the thick-walled part 100e and the spacer 2 is smaller than a distance between the outer surface of the thin-walled part 100f and the spacer 2.

In the present embodiment, the outer surface of the thick-walled part 100e is closer to the spacer 2 with increasing distance from the thin-walled part 100f in the first direction. In other words, the outer surface of the thick-walled part 100e is inclined so as to get close to the spacer 2 from the outer surface of the thin-walled part 100f in the first direction.

In the present embodiment, the thick-walled part 100e is formed in each of the first wall 100c and the second wall 100d of the body part 100b. Specifically, the thick-walled part 100e is formed in both the first end of each first wall 100c in the first direction and the first end of each second wall 100d in the first direction. The thick-walled part 100e is formed in an entire circumference of the first end (an end edge at the opening of the body part 100b) of the body part 100b in the first direction.

With regards to each first wall 100c, a thickness of the first end in the first direction is thicker than that of the second end in the first direction. With regards to each second wall 100d, a thickness of the first end in the first direction is thicker than that of the second end in the first direction.

The case body 100 may be manufactured by various processing methods. In the present embodiment, the case body 100 is formed by deep drawing.

A size and a shape of the lid 101 correspond to the opening of the case body 100. In the energy storage device 1 according to the present embodiment, with the closing part 100a being formed in a substantially rectangular shape, the opening is also formed in a substantially rectangular shape. Accordingly, the lid 101 is formed in a rectangular shape in correspondence with the opening of the case body 100.

The lid 101 has a pair of first end edges extending in the lateral direction at both longitudinal ends. In addition, the lid 101 has a pair of second end edges extending in the longitudinal direction at both lateral ends.

A pair of external terminals 11 is disposed in the lid 101. In the present embodiment, with the lid 101 being formed in a rectangular shape, each of the pair of external terminals 11 is disposed at two locations on both sides of the lid 101 in the longitudinal direction. Typically, holes passing through the case 10 are provided in a pair of terminal positions of the lid 101 and conductive members are inserted into the holes in order to electrically connect the external terminals 11 and an electrode assembly D.

The lid 101 and the thick-walled part 100e of the body part 100b are joined together by welding. Therefore, the energy storage device 1 according to the present embodiment has a welding part 102 formed by welding the lid 101 and the thick-walled part 100e of the body part 100b.

The welding part 102 is formed by applying a laser beam to an outer circumferential surface of the lid 101 and an outer circumferential surface of the thick-walled part 100e.

The energy storage apparatus according to the present embodiment includes a plurality of energy storage devices 1. The energy storage devices 1 are aligned in one direction. In the present embodiment, the energy storage devices 1 are aligned by orienting the first wall 100c of the case 10 in one direction. The energy storage apparatus includes bus bars that electrically connect external terminals 11 of two adjacent energy storage devices 1.

In the following description, a direction of alignment of the energy storage devices 1 is defined as an X-axis direction. In addition, one direction (a second direction) of two axial directions orthogonal to the direction of alignment of the energy storage devices 1 is defined as a Y-axis and a remaining direction (a first direction) is defined as a Z-axis. Three orthogonal axes (coordinate axes) corresponding to the X-axis, the Y-axis, and the Z-axis respectively are auxiliary illustrated in each drawing.

The spacer 2 has an insulating property. The spacer 2 has a base adjacent to the case 10 (the first wall 100c of the body part 100b) of each of the energy storage devices 1, and sealing parts. Furthermore, the spacer 2 has restricting parts for preventing a displacement of the energy storage device 1 adjacent to the base.

As described above, the energy storage apparatus includes a plurality of energy storage devices 1. The energy storage apparatus includes two types of spacers 2 as shown in FIG. 2. In other words, the energy storage apparatus includes, as the spacers 2, a spacer (hereinafter referred to as an inner spacer) 2A disposed between two energy storage devices 1 and a spacer (hereinafter referred to as an outer spacer) 2B adjacent to an energy storage device 1 located at the furthest end of the plurality of energy storage devices 1.

First, the inner spacer 2A is described. As shown in FIG. 4, the inner spacer 2A has a base 20A adjacent to the energy storage device 1 (the first wall 100c of the case body 100) and a pair of sealing parts 21A disposed at an interval in a Z-axis direction (a direction in that a pair of ends of the body part 100b is aligned). Furthermore, the inner spacer 2A has restricting parts 22A for preventing a displacement of two energy storage devices 1 adjacent to the base 20A (see FIG. 2).

The base 20A of the inner spacer 2A extends along an adjacent energy storage device 1 (the body part 100b of the energy storage device 1). The base 20A of the inner spacer 2A is sandwiched by two energy storage devices 1. The base 20A of the inner spacer 2A has a first surface facing one energy storage device 1 and a second surface that is on an opposite side of the first surface and faces the other energy storage device 1 of the two energy storage devices 1.

The base 20A of the inner spacer 2A extends along an adjacent energy storage device 1 (the body part 100b of the energy storage device 1). The base 20A of the inner spacer 2A forms a circulation passage 23A, between the base 20A and at least one energy storage device 1 of a pair of adjacent energy storage devices 1, for circulating fluid for cooling or heating the energy storage devices 1. The base 20A of the inner spacer 2A according to the present embodiment is formed in a rectangular wave shape continuous in the Z-axis direction. Therefore, the base 20A of the inner spacer 2A forms the circulation passages 23A between the base 20A and each of adjacent energy storage devices 1 in the X-axis direction.

In the energy storage device 1, the base 20A of the inner spacer 2A has a first contacting part 200A in contact with only one energy storage device 1 of two adjacent energy storage devices 1 and a second contacting part 201A in contact with only the other energy storage device 1 of the two adjacent energy storage devices 1. The base 20A of the inner spacer 2A has a connecting part 202A connecting the first contacting part 200A and the second contacting part 201A.

The first contacting part 200A extends in the Y-axis direction. The first contacting part 200A is in contact with the body part 100b (the first wall 100c) of the one energy storage device 1 over its entire length in the Y-axis direction. The second contacting part 201A extends in the Y-axis direction. The second contacting part 201A is in contact with the body part 100b (the first wall 100c) of the other energy storage device 1 over its entire length in the Y-axis direction.

The base 20A of the inner spacer 2A has a plurality of first contacting parts 200A and a plurality of second contacting parts 201A. Each of the first contacting parts 200A and each of the second contacting parts 201A are alternately disposed in the Z-axis direction.

Thus, in the energy storage apparatus, each of circulation passages 23A for circulating the fluid in the Y-axis direction is formed by a surface opposite to a surface of a first contacting part 200A in contact with an energy storage device 1 and a pair of connecting part 202A connecting the first contacting part 200A. In addition, each of circulation passages 23A for circulating the fluid in the Y-axis direction is formed by a surface opposite to a surface of a second contacting part 201A in contact with an energy storage device 1 and a pair of connecting part 202A connecting the second contacting part 201A. In this manner, in the energy storage apparatus, a plurality of circulation passages 23A are formed between a first surface of a base 20A of an inner spacer 2A and an energy storage device 1 and between a second surface of a base 20A of an inner spacer 2A and an energy storage device 1.

It is preferable that a gap is formed between the base 20A of the inner spacer 2A and an outer surface of the thick-walled part 100e. With this arrangement, the outer surface of the thick-walled part 100e does not come in contact with the base 20A of the inner spacer 2A. Thus, contact or adhesion between the sealing part 21A and the thin-walled part 100f is suppressed from being lowered by the outer surface of the thick-walled part 100e.

By a structure that each of a pair of sealing parts 21A is in close contact with the thin-walled part 100f, a circulation region for circulating the fluid between the pair of sealing parts 21A is defined. Furthermore, in the inner spacer 2A, all of first contacting parts 200A, second contacting parts 201A, and connecting parts 202A are disposed between the pair of sealing parts 21A. Accordingly, in the inner spacer 2A, circulation passages 23A are formed between the pair of sealing parts 21A.

Each of the sealing part 21A extends in the Y-axis direction. A length of a pair of sealing parts 21A in the Y-axis direction is approximately equal to a length of a first wall 100c of a body part 100b in the Y-axis direction. Accordingly, in the energy storage device 1, outflow of the fluid from a circulation region is suppressed since each sealing part 21A is in close contact with a first wall 100c of a body part 100b in the Y-axis direction substantially over its entire length.

One sealing part 21A of the pair of sealing parts 21A is in close contact with the first end of a thin-walled part 100f in the Z-axis direction and the other sealing part 21A of the pair of sealing parts 21A is in close contact with the second end of the thin-walled part 100f in the Z-axis direction.

Each sealing part 21A has a pair of contact parts 210A, 211A that is in close contact with adjacent energy storage devices 1, respectively. Each of the contact parts 210A, 211A extends from a base 20A in opposite directions from each other in the X-axis direction. In the present embodiment, each of the pair of contact parts 210A, 211A has an arc shape bulging in opposite directions from each other in the X-axis direction. A portion of one sealing part 21A (contact parts 210A, 211A) and a portion of a thick-walled part 100e are disposed side by side in the Z-axis direction.

It is preferable that an electrode assembly D of each energy storage device 1 is disposed at a position corresponding to a region between the pair of sealing parts 21A. In other words, it is preferable that an electrode assembly D of each energy storage device 1 is disposed in a region corresponding to a circulation region defined by the pair of sealing parts 21A from the first end in the Z-axis direction to the second end in the Z-axis direction. With this arrangement, a cooling or heating efficiency of an electrode assembly D is enhanced since the electrode assembly D is disposed in a region corresponding to a circulation region for circulating the fluid.

As described above, the inner spacer 2A is disposed between two adjacent energy storage devices 1. Therefore, in order to restrict relative displacement of two energy storage devices 1 adjacent to an inner spacer 2A, the restricting part 22A extends toward an energy storage device 1 adjacent to the first surface of the base 20A of the inner spacer 2A and an energy storage device 1 adjacent to the second surface of the base 20A of the inner spacer 2A.

Since the energy storage apparatus according to the present embodiment includes a plurality of energy storage devices 1, the inner spacer 2A is disposed between adjacent energy storage devices 1. The energy storage apparatus includes a plurality of inner spacers 2A.

Figure 5:
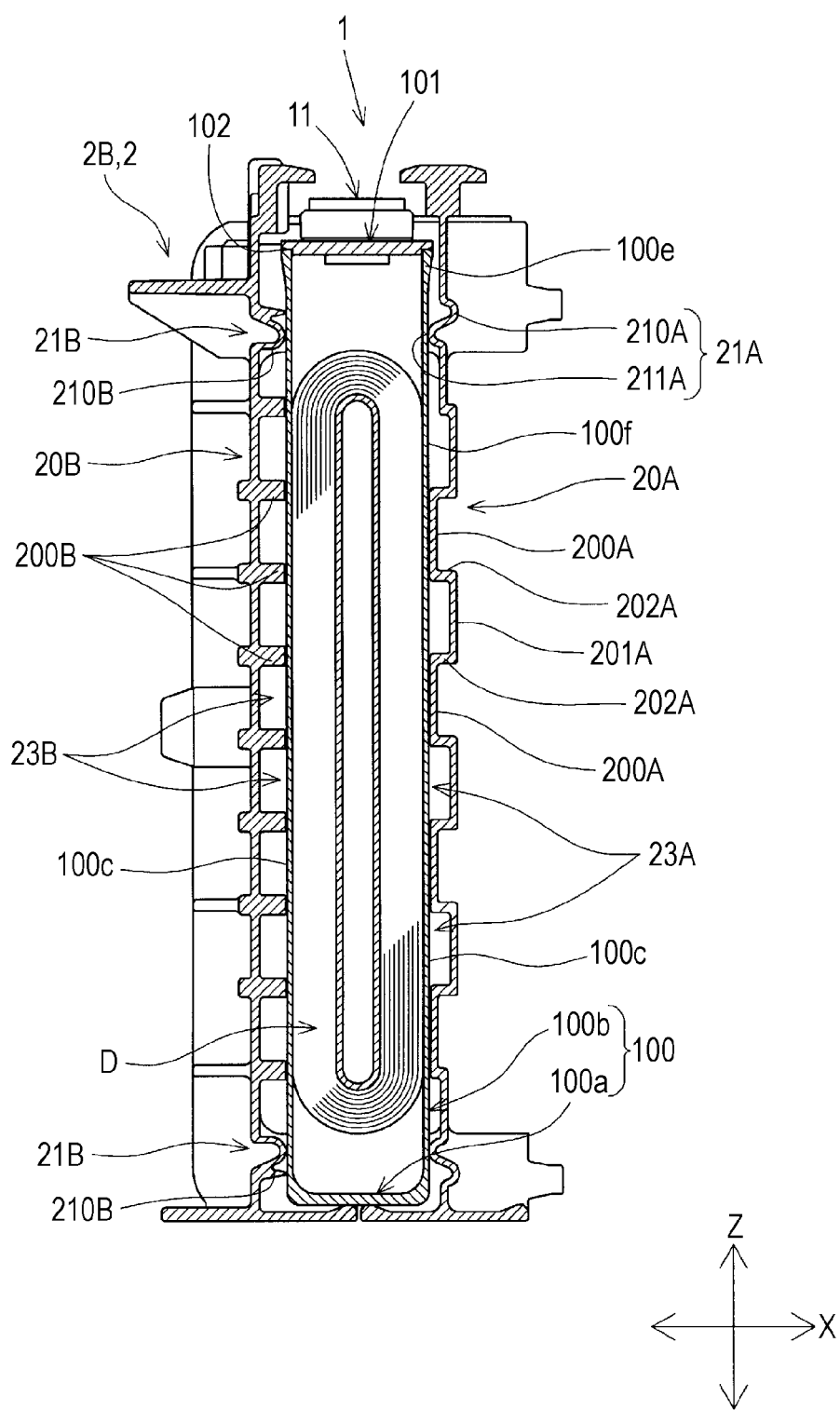
FIG. 5 is a vertical cross-sectional view of the energy storage device and an outer spacer.

Next, an outer spacer 2B is described. As shown in FIG. 5, an outer spacer 2B has a base 20B having a first surface facing a case body 100 (a first wall 100c of a body part 100b) of an energy storage device 1 and a second surface on the opposite side from the first surface, and a sealing part 21B. The outer spacer 2B has restricting parts 22B for determining a position of the energy storage device 1 adjacent to the base 20B (see FIG. 2).

The base 20B of the outer spacer 2B according to the present embodiment faces a holding member 3 (an end member 30, which will be described later, of a holding member 3). In other words, an outer spacer 2B is disposed between an energy storage device 1 and an end member 30.

The outer spacer 2B has a protruding part 200B that protrudes toward an energy storage device 1 from the first surface of the base 20B and is in contact with the energy storage device 1.

The base 20B of an outer spacer 2B extends along an adjacent energy storage device 1. The base 20B is formed in a plate shape.

The base 20B of the outer spacer 2B forms a circulation passage 23B, between the base 20B and an adjacent energy storage device 1, for circulating fluid for cooling or heating the energy storage device 1. By a structure that a protruding part 200B is in contact with the energy storage device 1 adjacent to the base 20B, a circulation passage 23B is formed between the base 20B and the energy storage device 1 adjacent to the base 20B.

The protruding part 200B extends in the Y-axis direction. The protruding part 200B is in contact with the body part 100b (the first wall 100c) of the energy storage device 1 over its entire length in the Y-axis direction. The base 20B of the outer spacer 2B according to the present embodiment has a plurality of protruding parts 200B. Each of the protruding parts 200B is disposed at an interval from one another in the Z-axis direction. As a result, a plurality of circulation passages 23B for circulating the fluid in the Y-axis direction are formed between the base 20B of the outer spacer 2B and the energy storage device 1.

It is preferable that a gap is formed between an outer surface of a thick-walled part 100e and a base 20B of an outer spacer 2B. With this structure, the outer surface of the thick-walled part 100e does not come into contact with the base 20B of the outer spacer 2B. Thus, contact or adhesion between a sealing part 21B and the thin-walled part 100f is suppressed from being lowered by the outer surface of the thick-walled part 100e.

By a structure that each of a pair of sealing parts 21B is in close contact with a thin-walled part 100f, a circulation region for circulating the fluid between the pair of sealing parts 21B is defined. In addition, in an outer spacer 2B, each protruding part 200B is disposed between the pair of sealing parts 21B. Accordingly, in the outer spacer 2B, a circulation passage 23B is formed between the pair of sealing parts 21B.

Each of the sealing parts 21B extends in the Y-axis direction. A length of the sealing parts 21B in the Y-axis direction is approximately equal to a length of the first wall 100c of a body part 100b in the Y-axis direction. Accordingly, in the energy storage device 1 according to the present embodiment, outflow of the fluid from the circulation region is suppressed since each of the sealing parts 21B is in close contact with the first wall 100c of the body part 100b in the Y-axis direction substantially over its entire length.

One sealing part 21B of the pair of sealing parts 21B is in close contact with the first end of the thin-walled part 100f in the Z-axis direction and the other sealing part 21B of the pair of sealing parts 21B is in close contact with the second end of the thin-walled part 100f in the Z-axis direction.

Each sealing part 21B has a contact part 210B that is in close contact with an adjacent energy storage device 1. The contact part 210B extends from the base 20B toward an adjacent energy storage device 1 in the X-axis direction. In the present embodiment, the contact part 210B has an arc shape bulging from the base 20B toward an adjacent energy storage device 1 in the X-axis direction. A portion of one sealing part 21B (contact part 210B) and a portion of the thick-walled part 100e are disposed side by side in the Z-axis direction.

It is preferable that an electrode assembly D of each energy storage device 1 is disposed at a position corresponding to a region between the pair of sealing parts 21B. In other words, it is preferable that an electrode assembly D of each energy storage device 1 is disposed in a region corresponding to a circulation region defined by the pair of sealing parts 21B from the first end in the Z-axis direction to the second end in the Z-axis direction. With this arrangement, a cooling or heating efficiency of an electrode assembly D is enhanced since the electrode assembly D is disposed in a region corresponding to a circulation region for circulating the fluid.

As described above, a first surface of an outer spacer 2B is adjacent to an energy storage device 1. In order to restrict relative displacement of an energy storage device 1 adjacent to the first surface of the outer spacer 2B, a restricting part 22B extends toward the energy storage device 1 adjacent to the first surface of the base 20B of the outer spacer 2B.

The outer spacer 2B according to the present embodiment is disposed so as to be adjacent to the inner spacer 2A via an energy storage device 1. The energy storage apparatus includes a pair of outer spacers 2B. The outer spacer 2B is adjacent to an energy storage device 1 at the furthest end of a plurality of energy storage devices 1. In other words, a pair of outer spacers 2B is provided so as to sandwich the plurality of aligned energy storage devices 1.

In addition, the first surface of each of outer spacers 2B faces the case body 100 of an energy storage device 1. Thus, each of outer spacers 2B is disposed such that the first surfaces of the bases 20B of the pair of outer spacers 2B face each other. Accordingly, in the energy storage apparatus, each of the pair of outer spacers 2B is disposed to be symmetrical with respect to each other in the X-axis direction.

In the present embodiment, a holding member 3 is made of metal. As shown in FIG. 2, a holding member 3 includes: a pair of end members 30 respectively disposed at positions adjacent to each outer spacer 2B; and a pair of frames 31 for connecting the pair of end members 30.

Each of end members 30 has a first surface facing an outer spacer 2B and a second surface opposite to the first surface. Each of the end members 30 has a pressure contacting part 300 in contact with the base 20B of the outer spacer 2B.

The insulator 4 is formed of an insulating material. The insulator 4 has a pair of insulating parts 40 that respectively insulate a pair of frames 31 from each energy storage device 1.

One insulating part 40 of the pair of insulating parts 40 is disposed between one frame 31 of the pair of frames 31 and energy storage devices 1 and between the one frame 31 and spacers 2 (inner spacers 2A and outer spacers 2B).

The other insulating part 40 of the pair of insulating parts 40 is disposed between the other frame 31 of the pair of frames 31 and the energy storage devices 1 and between the other frame 31 and the spacers 2 (the inner spacers 2A and the outer spacers 2B).

Figure 6:
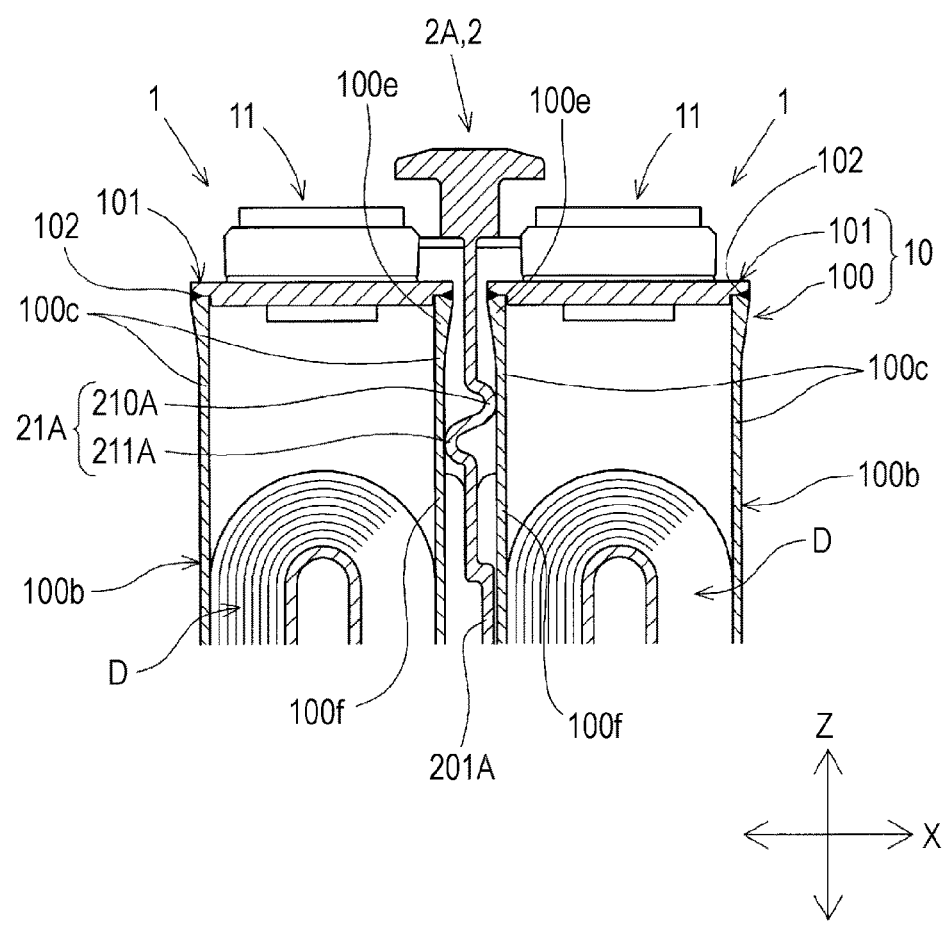
FIG. 6 is a diagram explaining a sealing part of the inner spacer.

According to the above energy storage apparatus, as shown in FIG. 6, since each of sealing parts 21A is in close contact with a thin-walled part 100f of an energy storage device 1, each inner spacer 2A may suppress the fluid flowing in a vicinity of a thin-walled part 100f from flowing in a vicinity of a thick-walled part 100e. In other words, the fluid flowing in a region corresponding to the thin-walled part 100f is suppressed from flowing toward a region corresponding to the thick-walled part 100e.

Figure 7:
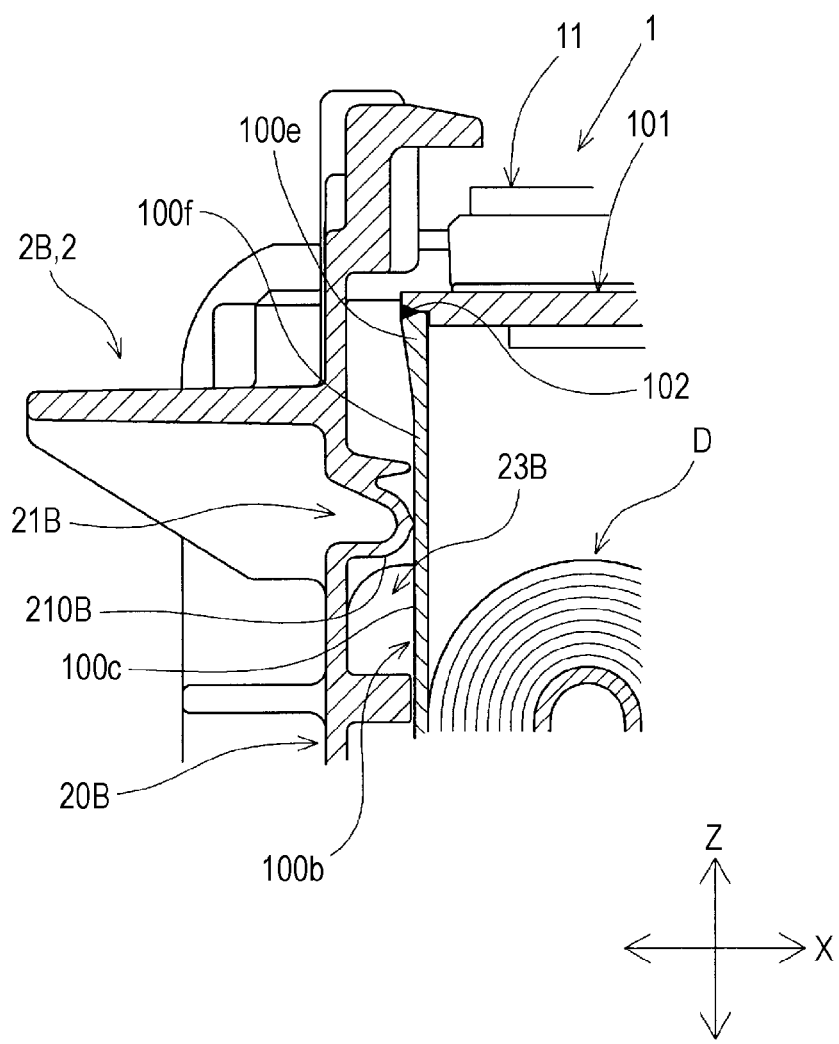
FIG. 7 is a diagram explaining a sealing part of the outer spacer.

As shown in FIG. 7, since each of sealing parts 21B is in close contact with the thin-walled part 100f of an energy storage device 1, each outer spacer 2B also suppresses the fluid flowing in a vicinity of the thin-walled part 100f from flowing in a vicinity of a thick-walled part 100e.

Accordingly, in the energy storage apparatus, since the thin-walled part 100f whose wall thickness is thinner than that of the thick-walled part 100e is actively cooled or heated by concentrating the fluid on a region corresponding to the thin-walled part 100f of a body part 100b, a cooling or heating efficiency of the energy storage device 1 is enhanced.

In addition, in the energy storage apparatus, since an interval between the outer surface of a thick-walled part 100e and the base of the spacer 2 is narrower than an interval between the outer surface of the thin-walled part 100f and the spacer 2, the fluid flowing in a vicinity of the thin-walled part 100f is suppressed from flowing toward a vicinity of the thick-walled part 100e, even when a gap is formed between the sealing part 21A and the thin-walled part 100f.

An interval between the outer surface of the thick-walled part 100e and the base 20A of the inner spacer 2A is narrower with increasing distance from the thin-walled part 100f in the Z-axis direction. Therefore, a pressure loss occurs in the fluid flowing from a vicinity of the thin-walled part 100f toward a vicinity of the thick-walled part 100e through a gap formed between the thin-walled part 100f and the sealing part 21A. Accordingly, the fluid is suppressed from flowing from a vicinity of the thin-walled part 100f toward a vicinity of the thick-walled part 100e, even when a gap is formed between one of the sealing parts 21A of the inner spacer 2A and the thin-walled part 100f.

An interval between the outer surface of the thick-walled part 100e and the base 20B of the outer spacer 2B is narrower with increasing distance from the thin-walled part 100f in the Z-axis direction. A pressure loss occurs in the fluid flowing from a vicinity of the thin-walled part 100f toward a vicinity of the thick-walled part 100e through a gap formed between the thin-walled part 100f and the sealing part 21B. Accordingly, the fluid is suppressed from flowing from a vicinity of the thin-walled part 100f toward a vicinity of the thick-walled part 100e, even when a gap is formed between one of the sealing parts 21B of the outer spacer 2B and the thin-walled part 100f.

As described above, in the energy storage apparatus, since the fluid is suppressed from flowing from a vicinity of the thin-walled part 100f toward a vicinity of the thick-walled part 100e, a cooling or heating efficiency of the energy storage device 1 is unlikely to be deteriorated.

In the energy storage devices 1 of the energy storage apparatus according to the present embodiment, a temperature of the thick-walled part 100e tends to rise since heat of external terminals 11 generated during charging and discharging is easily conducted to a thick-walled part 100e formed in the first end of a body part 100b. However, when fluid (cooling fluid) for cooling the energy storage devices 1 is circulated through a space (a circulation passage 23A in the present embodiment) between the pair of sealing parts 21A of the inner spacer 2A and a space (a circulation passage 23B in the present embodiment) between the pair of sealing parts 21B of the outer spacer 2B, a state is maintained in which heat of the thick-walled part 100e is easily conducted to the thin-walled part 100f since the thin-walled part 100f is actively cooled. As a result, a temperature of the thick-walled part 100e tends to drop. Accordingly, the cooling efficiency of the energy storage device 1 is further enhanced since the thick-walled part 100e and the thin-walled part 100f are effectively cooled.

In the energy storage device 1 of the energy storage apparatus according to the present embodiment, since the welding part 102 is formed for the thick-walled part 100e thicker than the thin-walled part 100f, it is easy to increase a welding depth or a welding area of the welding part 102. Accordingly, it is possible to increase a bonding strength between the body part 100b and the lid 101 and stabilize a welding quality therebetween.

In addition, in the energy storage apparatus, since a circulation region is defined in a region corresponding to an approximately entire region of the thin-walled part 100f of an adjacent energy storage device 1 by each of the inner spacer 2A and the outer spacer 2B, the cooling or heating efficiency of the energy storage device 1 is further increased by cooling or heating the approximately entire region of the thin-walled parts 100f of the energy storage device 1 by the fluid.

In the inner spacer 2A, since one of the sealing parts 21A is in contact with the first end of the thin-walled part 100f in the Z-axis direction and the other of the sealing parts 21A is in contact with the second end of the thin-walled part 100f in the Z-axis direction, a circulation region is defined in a region corresponding to an approximately entire region of the thin-walled part 100f by each sealing part 21A of the inner spacer 2A.

In the outer spacer 2B, since one of the sealing parts 21B is in contact with the first end of the thin-walled part 100f in the Z-axis direction and the other of the sealing parts 21B is in contact with the second end of the thin-walled part 100f in the Z-axis direction, a circulation region is defined in a region corresponding to an approximately entire region of the thin-walled part 100f by each sealing part 21B of the outer spacer 2B.

Accordingly, since an approximately entire region of a thin-walled part 100f of each energy storage device 1 is cooled or heated by the fluid flowing through a circulation region defined by the inner spacer 2A and a circulation region defined by the outer spacer 2B, the cooling or heating efficiency of the energy storage device 1 is further enhanced.

Note that the energy storage apparatus is not limited to the above embodiment and it is obvious that various modifications are made without departing from the scope of the present invention.

In the above embodiment, although it has been described that the body part 100b extends to an inner surface side from a circumference edge of the plate-shaped closing part 100a, it is not limited to this structure. For example, a body part 100b may have openings at both ends in the Z-axis direction. In this case, each opening of the body part 100b need only be closed by a separate lid 101. Furthermore, a body part 100b and each lid 101 need only be joined together by welding.

Figure 8:
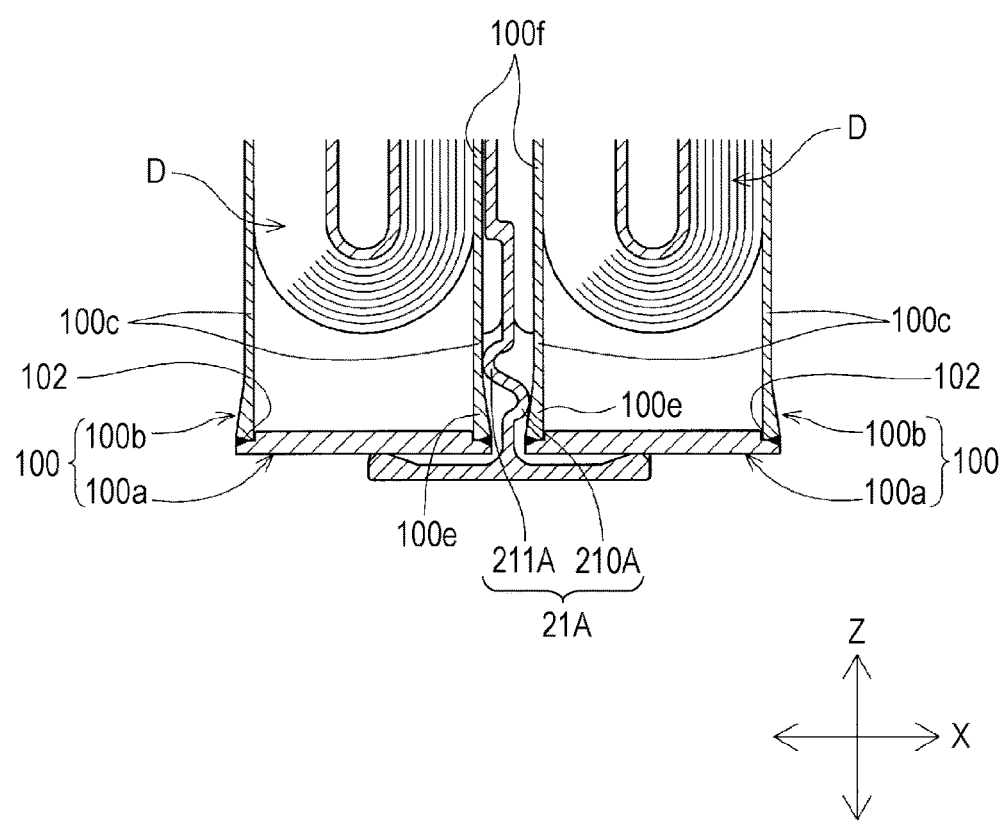
FIG. 8 is a diagram illustrating a shape of an energy storage device in an energy storage apparatus according to another embodiment of the present invention.

In the above embodiment, although the body part 100b has the thick-walled part 100e formed at the first end, it is not limited to this structure. For example, as shown in FIG. 8, a body part 100b may have a first thick-walled part 100e formed at the first end and a second thick-walled part 100e formed at the second end.

In the energy storage apparatus having such a structure, since each sealing part 21A of the inner spacer 2A and each sealing part 21B of the outer spacer 2B are in close contact with the thin-walled part 100*f*, the thick-walled part 100*e* and the thin-walled part 100*f* are effectively cooled and a cooling efficiency of the energy storage device 1 is enhanced. Note that a body part 100*b* may have, for example, only a second thick-walled part 100*e* formed at the second end.

Figure 9:
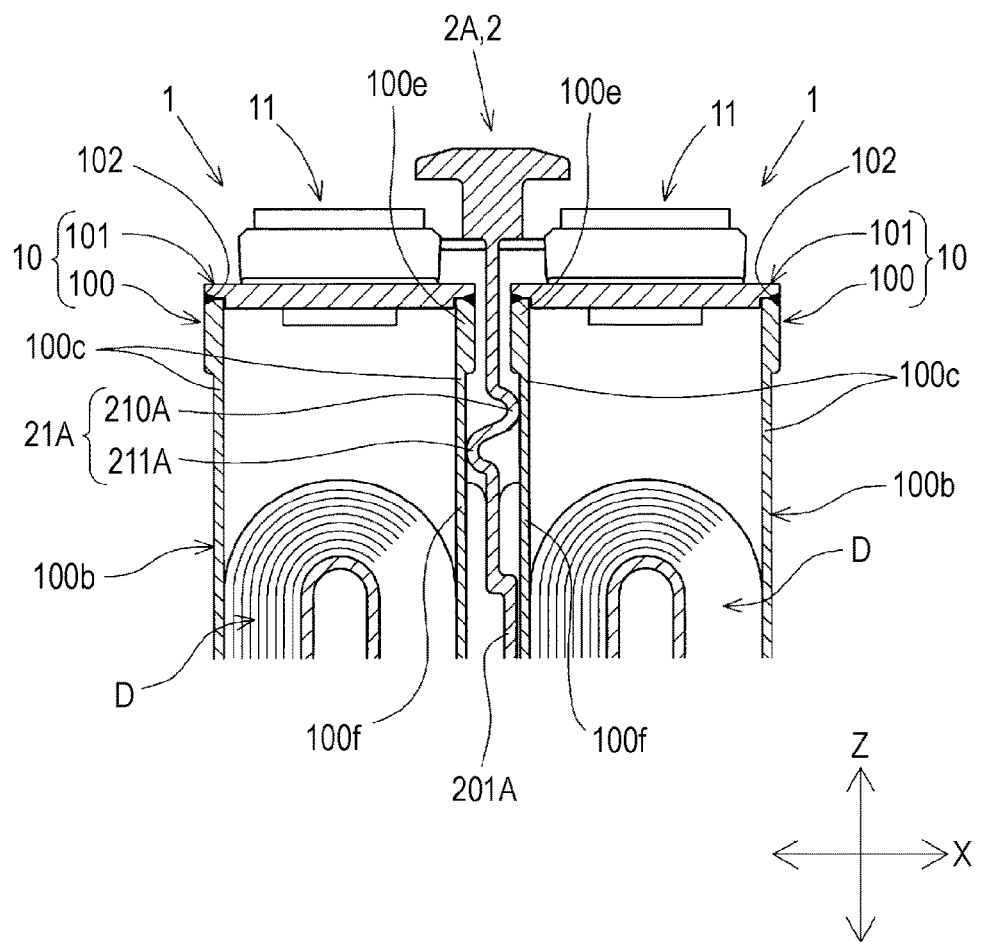
FIG. 9 is a diagram illustrating a shape of an energy storage device in an energy storage apparatus according to still another embodiment of the present invention.

In the above embodiment, although the outer surface of the thick-walled part 100*e* is formed so as to be closer to the spacer 2 with increasing distance from the thin-walled part 100*f*, it is not limited to this structure. For example, as shown in FIG. 9, an outer surface of a thick-walled part 100*e* and an outer surface of a thin-walled part 100*f* may be formed so as to form a level difference therebetween.

In the above embodiment, although it has been described that the thick-walled part 100*e* is formed over an entire circumference of the first end of the body part 100*b*, it is not limited to this structure. For example, a thick-walled part 100*e* may be formed only in a portion corresponding to each first wall 100*c* of the first end of a body part 100*b*.

Figure 10:
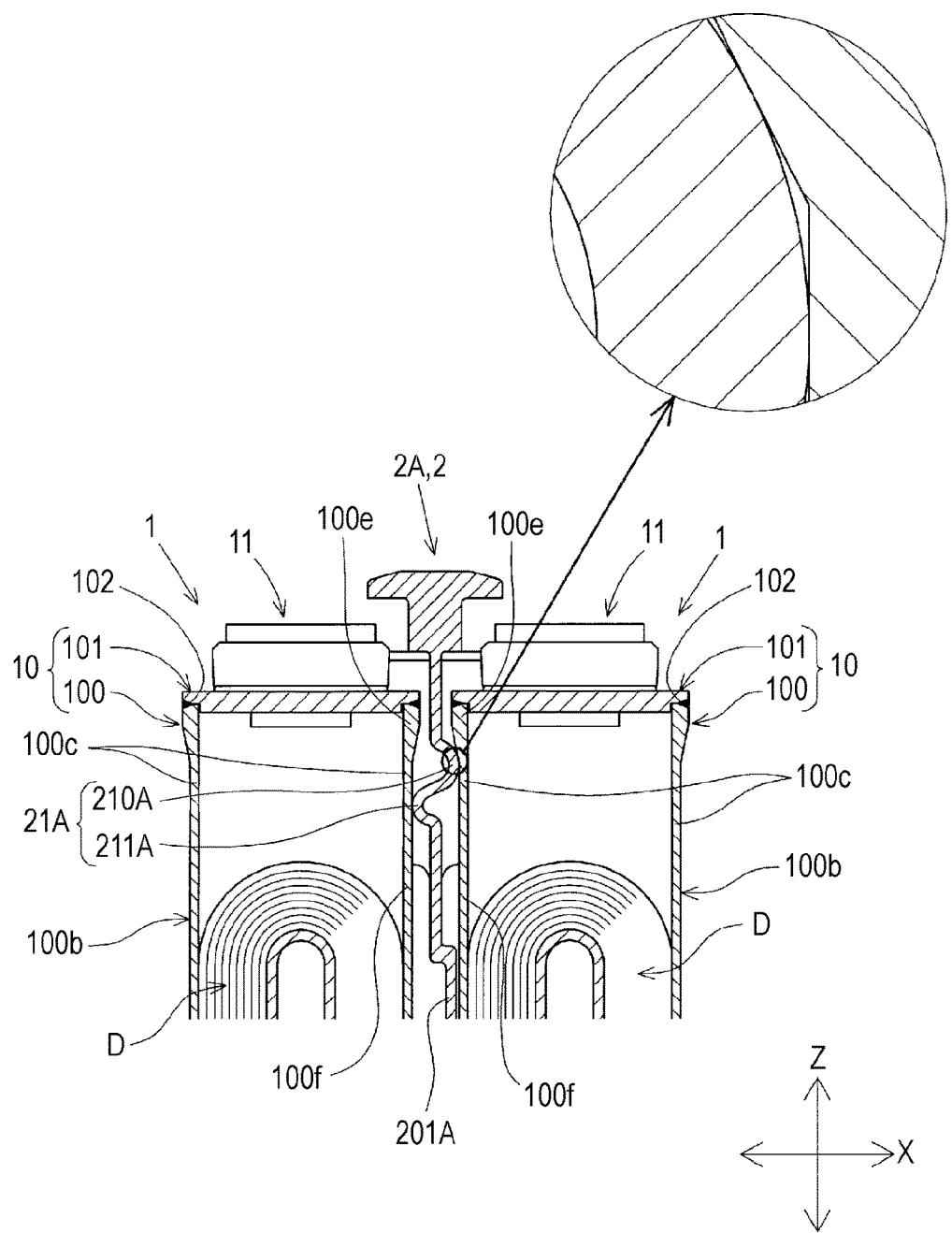
FIG. 10 is a diagram illustrating a shape of an inner spacer in an energy storage apparatus according to yet another embodiment of the present invention.

In the above embodiment, although it has been described that one sealing part 21A of the inner spacer 2A is in close contact with only the thin-walled part 100*f* of the body part 100*b*, it is not limited to this structure. For example, as shown in FIG. 10, one sealing part 21A of the inner spacer 2A may be in contact with a thick-walled part 100*e* in addition to a thin-walled part 100*f* of a body part 100*b*.

With this structure, since one sealing part 21A of the inner spacer 2A is in close contact with the first end of the thin-walled part 100*f* and is in close contact with the thick-walled part 100*e* formed at the first end of the body part 100*b*, the fluid is more reliably suppressed from flowing from a vicinity of the thin-walled part 100*f* toward a vicinity of the thick-walled part 100*e*. In other words, the fluid is more reliably suppressed from outflowing from a circulation region in the Z-axis direction. Accordingly, since the fluid tends to concentrate on a region corresponding to the thin-walled part 100*f* of the body part 100*b*, a cooling or heating efficiency of the energy storage device 1 tends to increase. Note that when a thick-walled part 100*e* (a second thick-walled part 100*e*) is formed in the second end of the body part 100*b*, the other sealing part 21A of the inner spacer 2A may be in close contact with the thick-walled part 100*e* in addition to the thin-walled part 100*f* of the body part 100*b*.

Although it has been described that one sealing part 21B of the outer spacer 2B is in close contact with only the thin-walled part 100*f* of the body part 100*b*, it is not limited to this structure. For example, one sealing part 21B of an outer spacer 2B may be in close contact with a thick-walled part 100*e* in addition to a thin-walled part 100*f* of the body part 100*b*. Note that when a thick-walled part 100*e* (a second thick-walled part 100*e*) is formed in the second end of a body part 100*b*, the other sealing part 21B of the outer spacer 2B may be in close contact with the thick-walled part 100*e* in addition to the thin-walled part 100*f* of the body part 100*b*.

In this case, since one sealing part 21B of the outer spacer 2B is in close contact with the first end of the thin-walled part 100*f* and is in close contact with the thick-walled part 100*e* formed at the first end of the body part 100*b*, the fluid is more reliably suppressed from flowing from a vicinity of the thin-walled part 100*f* toward a vicinity of the thick-walled part 100*e*. In other words, the fluid is more reliably suppressed from outflowing from a circulation region in the Z-axis direction. Accordingly, since the fluid tends to concentrate on a region corresponding to the thin-walled part 100*f* of the body part 100*b*, a cooling or heating efficiency of the energy storage device 1 tends to increase.

Figure 11:
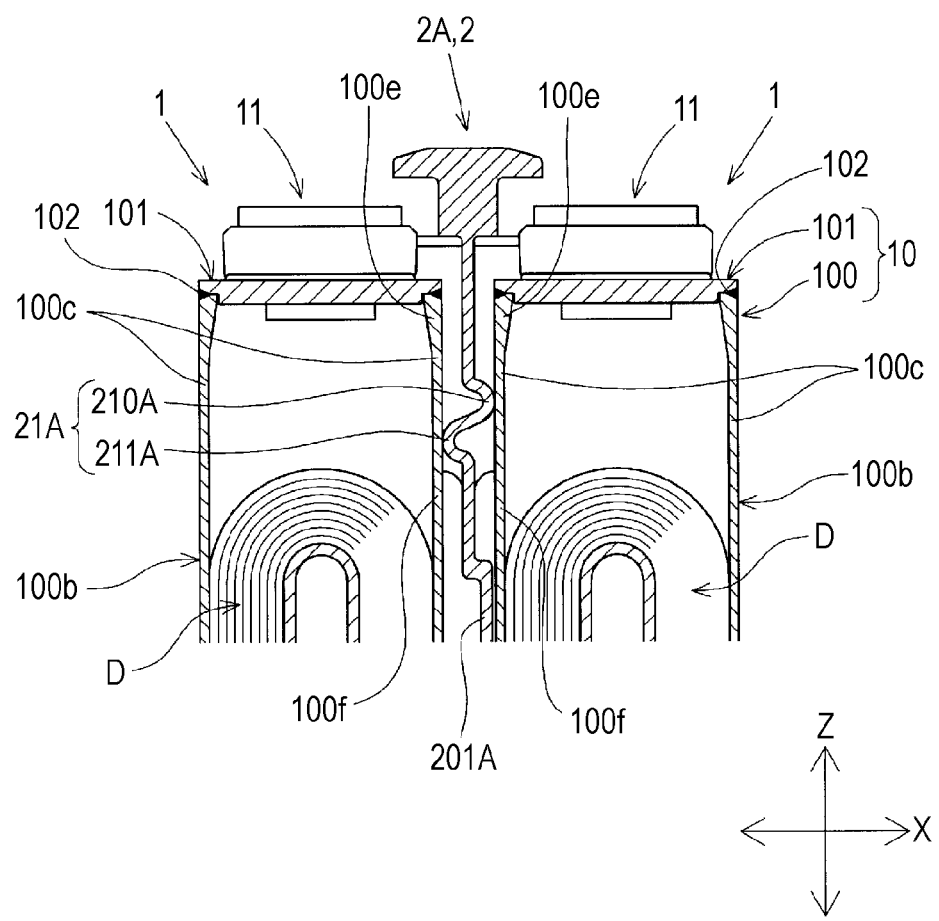
FIG. 11 is a diagram illustrating a shape of an inner spacer in an energy storage apparatus according to yet another embodiment of the present invention.

In the above embodiment, although the thick-walled part 100*e* is formed so as to protrude outward from the thin-walled part 100*f*, it is not limited to this structure. For example, as shown in FIG. 11, a thick-walled part 100*e* may be formed so as to protrude inward from a thin-walled part 100*f*. Note that a thick-walled part 100*e* may be formed so as to increase its thickness with increasing distance from a thin-walled part 100*f* in the Z-axis direction. In addition, an inner surface of a thick-walled part 100*e* and an inner surface of a thin-walled part 100*f* may be formed so as to form a level difference therebetween.

In the above embodiment, although the base 20A of the inner spacer 2A forms a circulation passage 23A between the base 20A and each of adjacent energy storage devices 1 in the X-axis direction, it is not limited to this structure. For example, a base 20A of an inner spacer 2A may form a circulation passage 23A between the base 20A and one of adjacent energy storage devices 1 in the X-axis direction.

In the above embodiment, although the contact part 210A, 211A of each sealing part 21A of the inner spacer 2A is formed in an arc shape bulging toward adjacent energy storage devices 1 in the X-axis direction, it is not limited to this structure. For example, a contact part 210A, 211A of each sealing part 21A of an inner spacer 2A may be made of a protrusion that protrudes toward adjacent energy storage devices 1 in the X-axis direction and extends in the Y-axis direction.

Furthermore, in the above embodiment, although the contact part 210B of each sealing part 21B of the outer spacer 2B is formed in an arc shape bulging toward an adjacent energy storage device 1 in the X-axis direction, it is not limited to this structure. For example, a contact part 210B of each sealing part 21B of an outer spacer 2B may be formed in a rib shape protruding toward an adjacent energy storage device 1 in the X-axis direction.

In the above embodiment, although the energy storage apparatus includes a plurality of energy storage devices 1, it is not limited to this structure. For example, the energy storage apparatus may include a single energy storage device 1. In this case, the energy storage apparatus need only include a pair of outer spacers 2B disposed on both sides of the energy storage device 1 in the X-axis direction.

In the above embodiment, although a circulation passage is formed between the base 20A of the inner spacer 2A and energy storage devices 1 by forming the base 20A in a rectangular wave shape, it is not limited to this structure. For example, a base 20A of an inner spacer 2A is not limited to one whose shape is a rectangular wave shape, as long as it is possible to circulate fluid between a first surface thereof and an energy storage device 1 (or between a second surface thereof and an energy storage device 1). Furthermore, when a circulation passage is not required to be formed between a base 20A of an inner spacer 2A and an energy storage device 1, the base 20A of the inner spacer 2A may be formed in a plate shape.

In the above embodiment, although an electrode assembly D is configured to be in contact with an inner surface of a case body 100, it is not limited to this structure. For example, an electrode assembly D may be configured not to be in contact with an inner surface of a case body 100 and may be configured to be indirectly in contact with the inner surface of the case body 100 via an insulating sheet.

In the above embodiment, although a type of the energy storage apparatus is not clearly described, the energy storage apparatus is not limited to any particular type. The energy storage apparatus according to the present embodiment may employ, as an energy storage device, one of various secondary batteries and others including a primary battery and a capacitor such as an electric double layer capacitor.

What is claimed is:

1. An energy storage apparatus, comprising:
an energy storage device and another energy storage device; and
a spacer located between the energy storage device and said another energy storage device,
wherein each of the energy storage device and said another energy storage device comprises a case body for accommodating an electrode assembly, the case body comprising a body part including an opening at at least a first end in a first direction, and a lid for closing the opening,
wherein the body part comprises:
a thick-walled part formed at at least one of the first end and a second end of the body part in the first direction; and
a thin-walled part thinner than the thick-walled part,
wherein the spacer comprises a pair of sealing parts disposed at an interval in the first direction and a base extending along the energy storage device and said another energy storage device,
wherein each of the sealing parts is in contact with the thin-walled part of the energy storage device,
wherein, in said each of the energy storage device and said another energy storage device, at least a part of a surface of the thick-walled part that faces the spacer is spaced apart from the spacer, and
wherein at least one of the pair of sealing parts includes a first contact part, contacting a surface of the energy storage device, and a second contact part, contacting a surface of said another energy storage device, the first contact part and the second contact part asymmetrically extending from the base with respect to the base.

2. The energy storage apparatus according to claim 1,
wherein said each of the sealing parts protrudes toward the energy storage device and said another energy storage device, respectively, from the base, and
wherein an outer surface of the thick-walled part protrudes toward the base from an outer surface of the thin-walled part.

3. The energy storage apparatus according to claim 1, wherein at least one of the pair of sealing parts is in contact with the thin-walled part and the thick-walled part.

4. The energy storage apparatus according to claim 1, wherein the energy storage device comprises an external terminal disposed on an outer surface of the lid, and
wherein the thick-walled part includes a first thick-walled part formed at the first end of the body part in the first direction.

5. The energy storage apparatus according to claim 4, wherein the body part is joined to the lid through a welding part formed in the first thick-walled part.

6. The energy storage apparatus according to claim 1, wherein the spacer defines a circulation region for circulating fluid between the spacer and the energy storage device by the pair of sealing parts in contact with the thin-walled part.

7. An energy storage apparatus, comprising:
an energy storage device and another energy storage device; and
a spacer located between the energy storage device and said another energy storage device,
wherein each of the energy storage device and said another energy storage device comprises a case body for accommodating an electrode assembly, the case body comprising an opening at a first end in a first direction, and a lid for closing the opening,
wherein the case body includes a thick-walled part formed at the first end of the case body in the first direction and a thin-walled part thinner than the thick-walled part, and the case body is joined to the lid through a welding part formed in the thick-walled part,
wherein the spacer includes a base that extends along the energy storage device adjacent thereto and a pair of sealing parts disposed at an interval in the first direction and defines a circulation region for circulating fluid between the spacer and the energy storage device by the pair of sealing parts protruding from the base and being in contact with the thin-walled part of the energy storage device,
wherein an outer surface of the thick-walled part protrudes toward the base from the thin-walled part,
wherein, in said each of the energy storage device and said another energy storage device, at least a part of a surface of the thick-walled part that faces the spacer is spaced apart from the spacer, and
wherein at least one of the pair of the sealing parts includes a first contacting part, contacting a surface of the energy storage device, and a second contact part, contacting a surface of said another energy storage device, the first contact part and the second contact part extending from the base in an opposing direction toward the energy storage device and the another energy storage device, respectively, the first contact part and the second contact part being arranged so as to shift from each other in the first direction.

8. The energy storage apparatus according to claim 1, wherein, in at least one of the energy storage device and said another energy storage device, the thick-walled part is located at the second end of the body part.

9. The energy storage apparatus according to claim 1, wherein, in at least one of the energy storage device and said another energy storage device, the thick-walled part is located at the first end and the second end of the body part.

10. The energy storage apparatus according to claim 1, wherein, in said each of the energy storage device and said another energy storage device, an entirety of said each of the sealing parts is spaced apart from the thick-walled part.

11. The energy storage apparatus according to claim 1, wherein, in said each of the energy storage device and said another energy storage device, an entirety of the spacer is spaced apart from the thick-walled part.

12. The energy storage apparatus according to claim 1, wherein the spacer extends in the first direction above the pair of sealing parts to a level higher than the opening.

13. The energy storage apparatus according to claim 1, wherein, in said each of the energy storage device and said another energy storage device, the case body further comprises a closing part extending in a second direction perpendicular to the first direction, the thin-walled part being thinner than the closing part.

14. The energy storage apparatus according to claim 1, wherein, in said each of the energy storage device and said another energy storage device, a part of a surface of the thin-walled part is spaced apart from the spacer.

15. The energy storage apparatus according to claim 7, wherein, in at least one of the energy storage device and said another energy storage device, the thick-walled part is further located at a second end of the ease body that extends in the first direction.

16. The energy storage apparatus according to claim 7, wherein, in said each of the energy storage device and said another energy storage device, an entirety of said each of the sealing parts is spaced apart from the thick-wailed part.

17. The energy storage apparatus according to claim 7, wherein, in said each of the energy storage device and said another energy storage device, an entirety of the spacer is spaced apart from the thick-walled part.

18. The energy storage apparatus according to claim 7, wherein the spacer extends in the first direction above the pair of sealing parts to a level higher than the opening.

19. The energy storage apparatus according to claim 7, wherein, in said each of the energy storage device and said another energy storage device, the case body further comprises a closing part extending in a second direction perpendicular to the first direction, the thin-walled part being thinner than the closing part.

20. The energy storage apparatus according to claim 7, wherein, in said each of the energy storage device and said another energy storage device, a part of a surface of the thin-walled part is spaced apart from the spacer.

* * * * *